(12) United States Patent  
Kawamura et al.

(10) Patent No.: US 11,769,907 B2  
(45) Date of Patent: Sep. 26, 2023

(54) ALL SOLID BATTERY

(71) Applicant: TAIYO YUDEN CO., LTD., Tokyo (JP)

(72) Inventors: Chie Kawamura, Tokyo (JP); Masashi Sekiguchi, Tokyo (JP); Daigo Ito, Tokyo (JP); Takato Satoh, Tokyo (JP); Sachie Tomizawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 283 days.

(21) Appl. No.: 16/819,836

(22) Filed: Mar. 16, 2020

(65) Prior Publication Data

US 2020/0313232 A1    Oct. 1, 2020

(30) Foreign Application Priority Data

Mar. 28, 2019    (JP) .................................. 2019-064689

(51) Int. Cl.
*H01M 10/0562*    (2010.01)
*H01M 10/052*    (2010.01)
(Continued)

(52) U.S. Cl.
CPC ..... *H01M 10/0562* (2013.01); *H01M 10/052* (2013.01); *H01M 10/0585* (2013.01);
(Continued)

(58) Field of Classification Search
None
See application file for complete search history.

(56) References Cited

U.S. PATENT DOCUMENTS

2004/0038124 A1* 2/2004 Hisamitsu ........... H01M 50/126  
429/161  
2009/0202912 A1 8/2009 Baba et al. .............. 429/231.95  
(Continued)

FOREIGN PATENT DOCUMENTS

JP    H 06-231796 A    8/1994  
JP    2009-33101 A    2/2009  
(Continued)

OTHER PUBLICATIONS

Notice of Reasons for Refusal dated Jan. 5, 2023, issued by the Japanese Patent Office in corresponding application JP 2019-064689.

(Continued)

*Primary Examiner* — Jonathan Crepeau  
(74) *Attorney, Agent, or Firm* — Stein IP, LLC

(57) ABSTRACT

An all solid battery includes: a multilayer chip in which each of solid electrolyte layers and each of electrodes are alternately stacked, a main component of the solid electrolyte layers being phosphoric acid salt-based solid electrolyte, the plurality of electrodes being alternately exposed to a first end face and a second end face of the multilayer chip, a first external electrode provided on the first end face; a second external electrode provided on the second end face; and wherein L/W is 0.2 or more and 1.1 or less, when a length of the multilayer chip in a first direction in which the first end face faces with the second end face is L, and a width of the multilayer chip in a second direction that is vertical to the first direction and a stacking direction of the multilayer chip is W.

7 Claims, 6 Drawing Sheets

(51) Int. Cl.
 *H01M 10/0585* (2010.01)
 *H01M 50/528* (2021.01)
 *H01M 50/11* (2021.01)

(52) U.S. Cl.
 CPC ......... *H01M 50/11* (2021.01); *H01M 50/528* (2021.01); *H01M 2300/0068* (2013.01); *H01M 2300/0094* (2013.01)

(56) References Cited

U.S. PATENT DOCUMENTS

| | | | |
|---|---|---|---|
| 2013/0017435 A1 | 1/2013 | Sato et al. | 429/158 |
| 2016/0141716 A1* | 5/2016 | Ito | H01M 4/136 429/162 |

FOREIGN PATENT DOCUMENTS

| | | |
|---|---|---|
| JP | 2011-216235 A | 10/2011 |
| JP | 2015-11864 A | 1/2015 |
| JP | 2015-220106 A | 12/2015 |
| JP | 2017-183052 A | 10/2017 |
| WO | WO 2007/135790 A1 | 11/2007 |

OTHER PUBLICATIONS

Notification of Reasons for Refusal dated Jun. 13, 2023 in counterpart Japanese Patent Application No. 2019-064689.

\* cited by examiner

FIG. 6

| | L (mm) | W (mm) | T (mm) | L/W | (L+W)/T | THICKNESS (μm) ELECTRIC COLLECTOR | THICKNESS (μm) SOLID ELECTROLYTE | RATE CHARACTERISTIC 1C/0.2C CAPACITY RATIO | CRACK/DELAMINATION OCCURRENCE RATE | TRANSVERSE STRENGTH |
|---|---|---|---|---|---|---|---|---|---|---|
| EXAMPLE 1 | 0.3 | 1.5 | 0.1 | 0.20 | 18.0 | 0.5 | 0.5 | 83% | 0% | 1.7 TIMES |
| EXAMPLE 2 | 0.3 | 0.28 | 0.1 | 1.07 | 5.8 | 0.5 | 0.5 | 78% | 0% | SAME |
| EXAMPLE 3 | 0.5 | 1 | 0.05 | 0.50 | 30.0 | 0.5 | 0.5 | 80% | 0% | 2.6 TIMES |
| EXAMPLE 4 | 0.5 | 1 | 0.1 | 0.50 | 15.0 | 0.5 | 0.5 | 80% | 0% | 1.5 TIMES |
| EXAMPLE 5 | 0.5 | 1 | 0.2 | 0.50 | 7.5 | 5 | 5 | 76% | 2% | 1.3 TIMES |
| EXAMPLE 6 | 0.5 | 1 | 0.5 | 0.50 | 3.0 | 10 | 10 | 72% | 4% | — |
| EXAMPLE 7 | 10 | 50 | 1 | 0.20 | 60.0 | 1 | 5 | 76% | 2% | — |
| EXAMPLE 8 | 30 | 50 | 1 | 0.60 | 80.0 | 5 | 5 | 74% | 4% | — |
| EXAMPLE 9 | 40 | 40 | 1 | 1.00 | 80.0 | 5 | 5 | 72% | 4% | — |
| EXAMPLE 10 | 0.3 | 1.5 | 0.1 | 0.20 | 18.0 | 0.5 | 0.5 | 80% | 0% | 1.5 TIMES |
| EXAMPLE 11 | 0.3 | 1.5 | 0.1 | 0.20 | 18.0 | 0 | 5 | 78% | 2% | 1.4 TIMES |
| COMPARATIVE EXAMPLE 1 | 1 | 0.7 | 0.1 | 1.43 | 17.0 | 0.5 | 0.5 | 62% | 10% | 0.9 TIMES |
| COMPARATIVE EXAMPLE 2 | 1 | 0.85 | 0.7 | 1.18 | 2.6 | 11 | 6 | × | 16% | — |

ALL SOLID BATTERY

CROSS-REFERENCE TO RELATED APPLICATION

This application is based upon and claims the benefit of priority of the prior Japanese Patent Application No. 2019-064689, filed on Mar. 28, 2019, the entire contents of which are incorporated herein by reference.

FIELD

A certain aspect of the present invention relates to an all solid battery.

BACKGROUND

Recently, secondary batteries are being used in various fields. Secondary batteries having electrolytic liquid have a problem such as leak of the electrolytic liquid. And so, all solid batteries having a solid electrolyte and other solid elements are being developed (for example, see Japanese Patent Application Publication No. H06-231796, Japanese Patent Application Publication No. 2011-216235, Japanese Patent Application Publication No. 2017-183052, and Japanese Patent Application Publication No. 2015-220106).

SUMMARY OF THE INVENTION

From a viewpoint of increasing of capacity density of the all solid battery, it is preferable that a thickness of an electric collector is reduced, and a height of the all solid battery is reduced. However, when the thickness of the electric collector layer is reduced, a cross section area of the electric collector layer is reduced. In this case, current collection efficiency of the electric collector layer may be degraded. Responsiveness (rate characteristic) may be degraded because of increasing of an electrical resistance, when a substance of which conductivity is low is used for the electric collector or an auxiliary agent of an electrode layer in order to reduce cost or when the electric collector is not provided.

The present invention has a purpose of providing an all solid battery that is capable of achieving favorable rate characteristic.

According to an aspect of the present invention, there is provided an all solid battery including: a multilayer chip in which each of a plurality of solid electrolyte layers and each of a plurality of electrodes are alternately stacked, a main component of the solid electrolyte layers being phosphoric acid salt-based solid electrolyte, the multilayer chip having a rectangular parallelepiped shape, the plurality of electrodes being alternately exposed to a first end face and a second end face of the multilayer chip, the first end face facing with the second end face, a first external electrode provided on the first end face; a second external electrode provided on the second end face; and wherein L/W is 0.2 or more and 1.1 or less, when a length of the multilayer chip in a first direction in which the first end face faces with the second end face is L, and a width of the multilayer chip in a second direction that is vertical to the first direction and a stacking direction of the multilayer chip is W.

BRIEF DESCRIPTION OF THE DRAWINGS

FIG. 6 illustrates results of examples 1 to 11 and comparative examples 1 and 2.

DETAILED DESCRIPTION

A description will be given of an embodiment with reference to the accompanying drawings.

Figure 1:
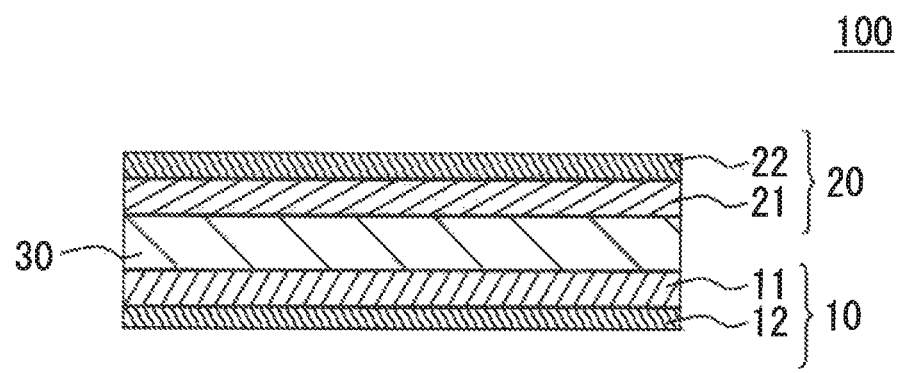
FIG. 1 illustrates a schematic cross section of an all solid battery.

(Embodiment) FIG. 1 illustrates a schematic cross section of an all solid battery 100 in accordance with an embodiment. As illustrated in FIG. 1, the all solid battery 100 has a structure in which a first electrode 10 and a second electrode 20 sandwich a phosphoric acid salt-based solid electrolyte layer 30. The first electrode 10 is provided on a first main face of the solid electrolyte layer 30. The first electrode 10 has a structure in which a first electrode layer 11 and a first electric collector layer 12 are stacked. The first electrode layer 11 is on the solid electrolyte layer 30 side. The second electrode 20 is provided on a second main face of the solid electrolyte layer 30. The second electrode 20 has a structure in which a second electrode layer 21 and a second electric collector layer 22 are stacked. The second electrode layer 21 is on the solid electrolyte layer 30 side.

When the all solid battery 100 is used as a secondary battery, one of the first electrode 10 and the second electrode 20 is used as a positive electrode and the other is used as a negative electrode. In the embodiment, as an example, the first electrode 10 is used as a positive electrode, and the second electrode 20 is used as a negative electrode.

At least, the solid electrolyte layer 30 is a phosphoric acid salt-based solid electrolyte. For example, the phosphoric acid salt-based electrolyte has a NASICON structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first electrode layer 11 and the second electrode layer 21 is added in advance, is used. For example, when the first electrode layer 11 and the second electrode layer 21 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte. When the first electrode layer 11 and the second electrode layer 21 include phosphoric acid salt including Li and a transition metal other than Co, it is preferable that the solid electrolyte layer 30 includes Li—Al—Ge—PO$_4$-based material in which the transition metal is added in advance.

At least, the first electrode layer 11 used as a positive electrode includes a material having an olivine type crystal structure, as an electrode active material. It is preferable that the second electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, LiCoPO$_4$ including Co may be used as a typical example of the electrode active material having the olivine type crystal structure. Other salts of phosphoric acid, in which Co acting as a transition metal is replaced to another transition metal in the above mentioned chemical formula, may be used. A ratio of Li or PO$_4$ may fluctuate in accordance with a valence. It is preferable that Co, Mn, Fe, Ni or the like is used as the transition metal.

The electrode active material having the olivine type crystal structure acts as a positive electrode active material in the first electrode layer 11 acting as a positive electrode. For example, when only the first electrode layer 11 includes the electrode active material having the olivine type crystal structure, the electrode active material acts as the positive electrode active material. When the second electrode layer 21 also includes an electrode active material having the olivine type crystal structure, discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

When both the first electrode layer 11 and the second electrode layer 21 include an electrode active material having the olivine type crystal structure, the electrode active material of each of the first electrode layer 11 and the second electrode layer 21 may have a common transition metal. Alternatively, the a transition metal of the electrode active material of the first electrode layer 11 may be different from that of the second electrode layer 21. The first electrode layer 11 and the second electrode layer 21 may have only single type of transition metal. The first electrode layer 11 and the second electrode layer 21 may have two or more types of transition metal. It is preferable that the first electrode layer 11 and the second electrode layer 21 have a common transition metal. It is more preferable that the electrode active materials of the both electrode layers have the same chemical composition. When the first electrode layer 11 and the second electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first electrode layer 11 and the second electrode layer 21, moreover, oxide-based solid electrolyte material or a conductive material (conductive auxiliary agent) such as a carbon or a metal may be added. When the material is evenly dispersed into water or organic solution together with binder or plasticizer, paste for electrode layer is obtained. Pd, Ni, Cu, or Fe, or an alloy thereof may be used as a metal of the conductive auxiliary agent.

The first electric collector layer 12 and the second electric collector layer 22 include Pd, as a conductive material. Pd is hardly oxidized and hardly reacts with each material, in a process of sintering each layer by firing. Among metals, Pd has large adhesive strength with ceramics. It is therefore possible to achieve large adhesive strength between the first electrode layer 11 and the first electric collector layer 12. And it is possible to achieve large adhesive strength between the second electrode layer 21 and the second electric collector layer 22. Accordingly, when the first electric collector layer 12 and the second electric collector layer 22 include Pd, the all solid battery 100 achieves preferable performance. As well as the conductive auxiliary agent, C, Ni, Cu, Fe or an alloy thereof may be used for the first electric collector layer 12 and the second electric collector layer 22.

Figure 2:
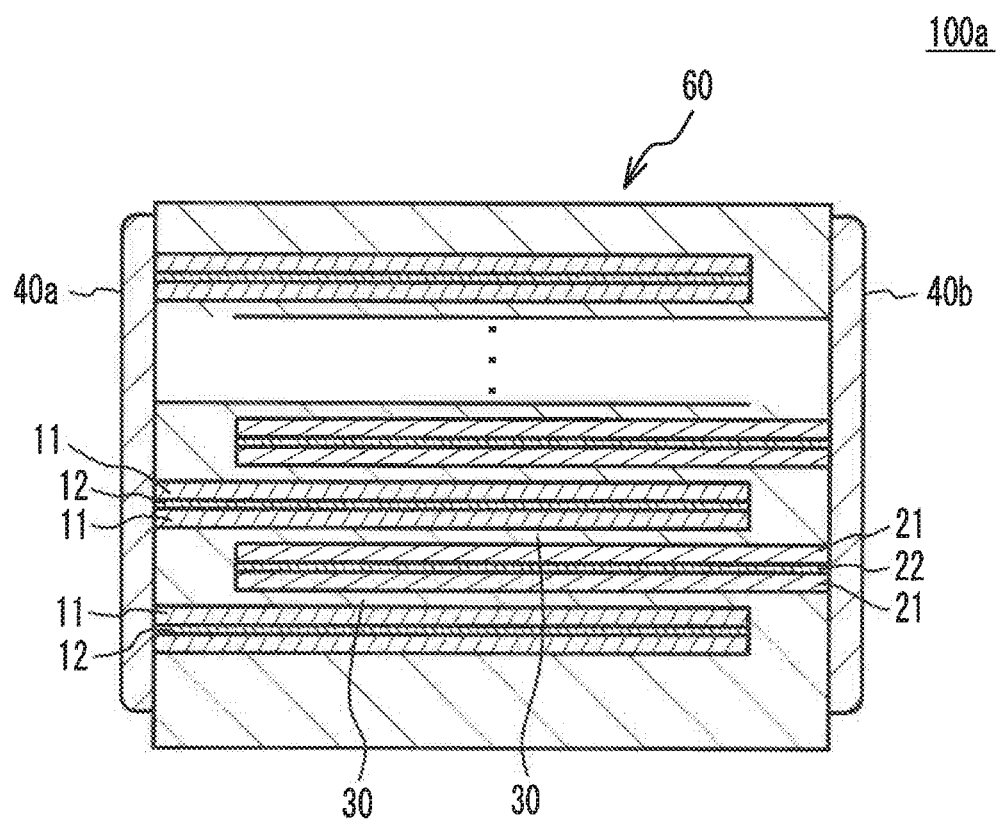
FIG. 2 illustrates a schematic cross section of another all solid battery.

FIG. 2 illustrates a schematic cross section of an all solid battery 100a in which a plurality of cell units are stacked. The all solid battery 100a has a multilayer chip 60 having a rectangular parallelepiped shape, a first external electrode 40a provided on a first edge face of the multilayer chip 60, and a second external electrode 40b provided on a second edge face facing with the first edge face.

In four faces other than the two end faces of the multilayer chip 60, two faces other than an upper face and a lower face of the multilayer chip 60 in a stacking direction are referred to as side faces. The first external electrodes 40a and the second external electrode 20b extend to the upper face, the lower face and the two side faces of the multilayer chip 60. However, the first external electrode 40a and the second external electrode 40b are spaced from each other.

In the following description, the same numeral is added to each member that has the same composition range, the same thickness range and the same particle distribution range as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode 40a and the second external electrode 40b.

The first electrode layer 11 is stacked on the first electric collector layer 12. The solid electrolyte layer 30 is stacked on the first electrode layer 11. The solid electrolyte layer 30 extends from the first external electrode 40a to the second external electrode 40b. The second electrode layer 21 is stacked on the solid electrolyte layer 30. The second electric collector layer 22 is stacked on the second electrode layer 21. Another second electrode layer 21 is stacked on the second electric collector layer 22. Another solid electrolyte layer 30 is stacked on the second electrode layer 21. The solid electrolyte layer 30 extends from the first external electrode 40a to the second external electrode 40b. The first electrode layer 11 is stacked on the solid electrolyte layer 30. In the all solid battery 100a, the stack units are repeatedly stacked. Therefore, the all solid battery 100a has a structure in which a plurality of cell units are stacked.

In the structure of FIG. 2, a structure in which two of the first electrode layers 11 sandwich the first electric collector layer 12 acts as a single electrode. And a structure in which two of the second electrode layers 21 sandwich the second electric collector layer 22 acts as a single electrode. In this case, the multilayer chip 60 has a structure in which each of the plurality of solid electrolyte layers 30 and each of the plurality of electrodes are alternately stacked. The structure has a rectangular parallelepiped shape. The plurality of electrodes are alternately exposed to the two end faces facing with each other.

Figure 3A:
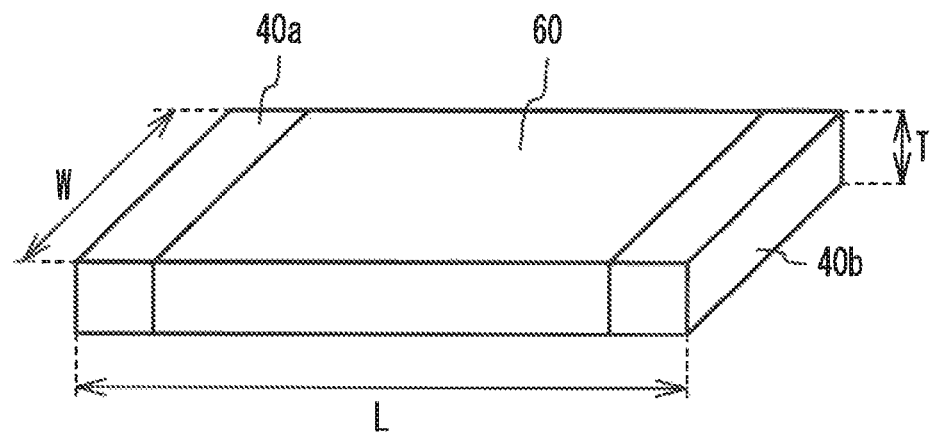
FIG. 3A and FIG. 3B illustrate a perspective external view of an all solid battery.

FIG. 3A illustrates an external perspective view of the all solid battery 100a. As illustrated in FIG. 3A, a length of the multilayer chip 60 in a direction in which the first external electrode 40a faces with the second external electrode 40b is a length L. A thickness of the multilayer chip 60 in the stacking direction is a thickness T. A width of the multilayer chip 60 in a direction in which the two side faces face with each other is a width W. The width W is vertical to the length L and the thickness T.

In the all solid battery 100a, the first external electrode 40a faces with the second external electrode 40b in the direction of the length L. Therefore, a current collection direction is the direction of the length L. In the example of FIG. 3A, the length L is large. Therefore, a distance for current collection is large. An electrical resistance in the direction for current collection may be largely increased, when the thicknesses of the first electric collector layer 12 and the second electric collector layer 22 are reduced or when the first electric collector layer 12 and the second electric collector layer 22 are not provided. In the example of FIG. 3A, the width W is small. Therefore, cross section areas of the first electrode layer 11, the first electric collector layer 12, the second electrode layer 21 and the second electric collector layer 22 are small in faces vertical to the direction of the length L, because the width W is small. Therefore, the electrical resistance in the direction for current collection may be largely increased, when the thicknesses of the first electric collector layer 12 and the second electric collector layer 22 are reduced, or when the first electric collector layer 12 and the second electric collector layer 22 are not provided.

Figure 3B:
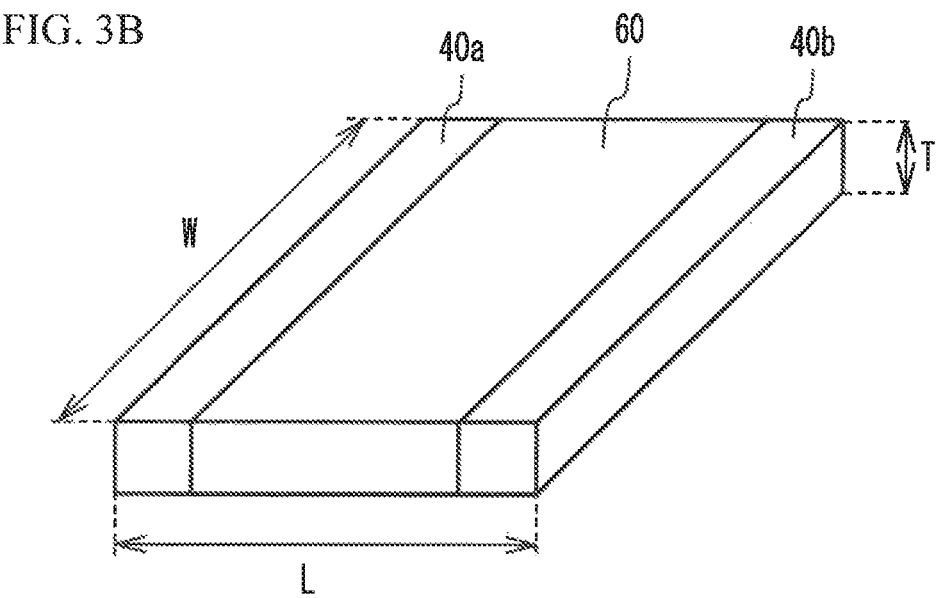

And so, in the embodiment, as illustrated in FIG. 3B, the length L is small, and the width W is large. When the length L is reduced, the distance for current collection is reduced. Therefore, increasing of the electrical resistance in the direction for current collection is suppressed, even if the thicknesses of the first electric collector layer 12 and the second electric collector layer 22 are reduced or even if the first electric collector layer 12 and the second electric collector layer 22 are not provided. When the width W is large, the cross section areas of the first electrode layer 11, the first electric collector layer 12, the second electrode layer 21 and the second electric collector layer 22 are large in a face vertical to the direction of the length L. It is therefore possible to suppress the increasing of the electrical resistance in the direction for current collection, even if the thicknesses of the first electric collector layer 12 and the second electric collector layer 22 are reduced or even if the first electric collector layer 12 and the second electric collector layer 22 are not provided. Accordingly, in the embodiment, the responsiveness of the all solid battery 100a is secured because of suppression of the increasing of the electrical resistance, and favorable rate characteristic is achieved, even if the capacity density of the all solid battery 100 is increased. The thickness for achieving the same capacity is suppressed. Therefore, sintering stability is improved. And, the occurrence of the crack, the delamination or the like is suppressed. Moreover, when the width W is large, the first external electrode 40a and the second external electrode 40b are long. Therefore, even if the all solid battery 100 is thin, large strength is achieved.

It is preferable that a ratio L/W has an upper limit, from a viewpoint of sufficiently reducing the length L and sufficiently enlarging the width W. In the embodiment, the ratio L/W is 1.1 or less. It is more preferable that the ratio L/W is 1.0 or less, from a view point of sufficiently reducing the length L and sufficiently increasing the width W.

On the other hand, when the ratio L/W is excessively small, short may occur because the first external electrode 40a is excessively close to the second external electrode 40b. And so, it is preferable that the ratio L/W has a lower limit. In the embodiment, it is preferable that the ratio L/W is 0.2 or more. It is more preferable that the ratio L/W is 0.5 or more.

From a viewpoint of high capacity density of the all solid battery 100a, it is preferable that the first electric collector layer 12 and the second electric collector layer 22 are thin. For example, it is preferable that the average thicknesses of the first electric collector layer 12 and the second electric collector layer 22 are 10 μm or less. It is more preferable that the average thicknesses are 5 μm or less. On the other hand, the electric collector layers may be broken (continuity modulus may be reduced) and a film shape may not be necessarily maintained, or the electric collector layers may be included in the electrode during the firing and the electric collector layer may disappear, when the thicknesses of the first electric collector layer 12 and the second electric collector layer 22 are excessively small. And so, it is preferable that the average thicknesses of the first electric collector layer 12 and the second electric collector layer 22 have a lower limit. For example, it is preferable that the average thicknesses are 0.5 μm or more. It is more preferable that the average thicknesses are 1 μm or more.

From a viewpoint of high capacity density of the all solid battery 100a, it is preferable that the solid electrolyte layers 30 are thin. For example, it is preferable that an average thickness of the solid electrolyte layers 30 is 10 μm or less. It is more preferable that the average thickness is 5 μm or less. On the other hand, when the solid electrolyte layers 30 are excessively thin, defect such as short may occur. And so, it is preferable that the average thickness of the solid electrolyte layers 30 has a lower limit. For example, it is preferable that the average thickness of the solid electrolyte layers 30 is 0.5 μm or more.

When (L+W)/T is excessively small, a ratio of the thickness is large with respect to the chip size (projected area). Therefore, delamination tends to occur during degreasing or the firing. And so, it is preferable that (L+W)/T has a lower limit. For example, it is preferable that (L+W)/T is 3 or more. When (L+W)/T is excessively large, the thickness of the all solid battery 100a is small. In this case, even if L and W are reversed, strength may be small. And so, it is preferable that (L+W)/T has an upper limit. For example, it is preferable that (L+W)/T is 85 or less. It is more preferable that (L+W)/T is 80 or less.

Figure 4:
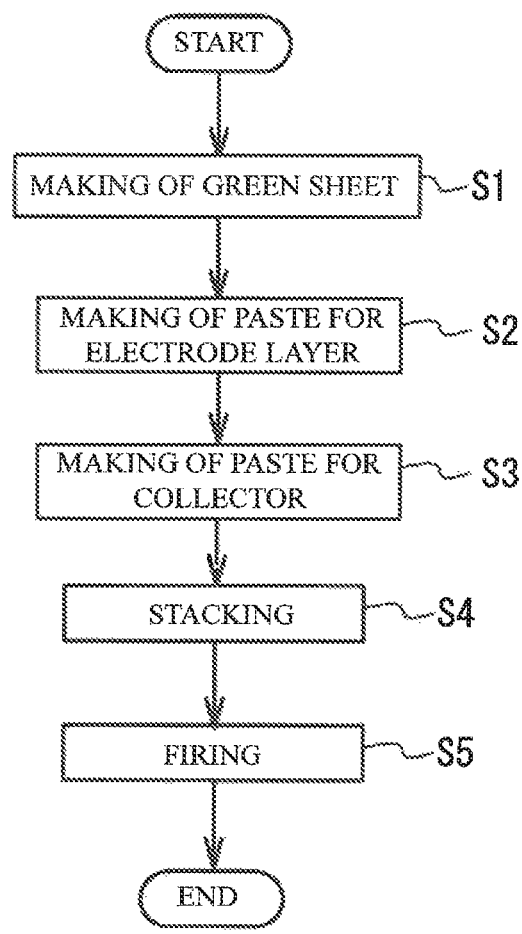
FIG. 4 illustrates a flowchart of a manufacturing method of an all solid battery.

A description will be given of a manufacturing method of the all solid battery 100a. FIG. 4 illustrates a flowchart of the manufacturing method of the all solid battery 100a.

(Making process of green sheet) Powder of the phosphoric acid salt-based solid electrolyte structuring the solid electrolyte layer 30 is made. For example, it is possible to make the powder of the phosphoric acid salt-based solid electrolyte structuring the solid electrolyte layer 30, by mixing raw material and additives and using solid phase synthesis method or the like. The resulting powder is subjected to dry grinding. Thus, a grain diameter of the resulting power is adjusted to a desired one.

The resulting powder is evenly dispersed into aqueous solvent or organic solvent together with a binding agent, a dispersing agent, a plasticizer and so on. The resulting power is subjected wet crushing. And solid electrolyte slurry having a desired grain diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a green sheet is obtained. The painting method is not limited. For example, a slot die method, a reverse coat method, a gravure coat method, a bar coat method, a doctor blade method or the like may be used. It is possible to measure grain diameter distribution after the wet crushing, with use of a laser diffraction measuring device using a laser diffraction scattering method.

(Making process of paste for electrode layer) Next, paste for electrode layer is made in order to make the first electrode layer 11 and the second electrode layer 21. For example, a conductive auxiliary agent, an active material, a solid electrolyte material, a binder, a plasticizer and so on are evenly dispersed into water or organic solvent. Thus, paste for electrode layer is obtained. The above-mentioned solid electrolyte paste may be used as the solid electrolyte material. Pd, Ni, Cu, Fe, an alloy including two or more of them, or a carbon material may be used as the conductive auxiliary agent. When the composition of the first electrode layer 11 is different from that of the second electrode layer 21, paste for electrode layer used for the first electrode layer 11 and another paste for electrode layer used for the second electrode layer 21 may be individually made.

(Making process of paste for electric collector) Next, paste for electric collector is made in order to make the first electric collector layer 12 and the second electric collector layer 22. It is possible to make the paste for electric collector, by evenly dispersing powder of Pd, carbon black, board-shaped graphite carbon, a binder, dispersant, plasticizer and so on into water or organic solvent.

Figure 5:
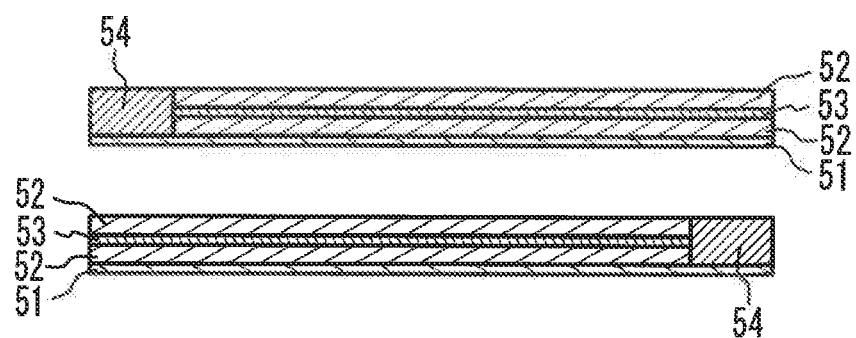
FIG. 5 illustrates a stacking process.

(Stacking process) Paste 52 for electrode layer is printed on one face of a green sheet 51 as illustrated in FIG. 5. Paste 53 for electric collector is printed on the paste 52 for electrode layer. And, another paste 52 for electrode layer is printed on the paste 53 for electric collector. A reverse pattern 54 is printed on a part of the green sheet 51 where neither the paste 52 for electrode layer nor the paste 53 for electric collector is printed. A material of the reverse pattern 54 may be the same as that of the green sheet 51. The green sheets 51 after printing are stacked so that each of the green sheets 51 is alternately shifted to each other. Thus, a multilayer structure is obtained. In this case, in the multilayer structure, a pair of the paste 52 for electrode layer and the paste 53 for electric collector are alternately exposed to the two edge faces of the multilayer structure.

(Firing process) Next, the obtained multilayer structure is fired. In the firing process, it is preferable that a maximum temperature is 400 degrees C. to 1000 degrees C. in an oxidizing atmosphere or non-oxidizing atmosphere. It is more preferable that that maximum temperature is 500 degrees C. to 900 degrees C. In order to sufficiently remove the binder until the maximum temperature, a process for keeping a temperature lower than the maximum temperature in an oxidizing atmosphere may be performed. It is preferable that the firing is performed in the lowest possible temperature, from a viewpoint of reduction of the process cost. After the firing, a re-oxidizing process may be performed. In this manner, the multilayer chip 60 is manufactured.

(Forming process of external electrode) After that, metal paste is applied to the two end faces of the multilayer chip 60. And, the metal paste is fired. Thus, the first external electrode 40a and the second external electrode 40b are formed. Alternatively, the multilayer chip 60 may be put in a dedicated tool so that the first external electrode 40a is spaced from the second external electrode 40b on the upper face, the lower face and the two side faces connected to the two end faces. And, electrodes may be formed by a sputtering. The first external electrode 40a and the second external electrode 40b may be formed by plating on the formed electrodes.

EXAMPLES

The all solid batteries in accordance with the embodiment were made and the property was measured.

(Example 1) $Co_3O_4$, $Li_2CO_3$, dihydrogen phosphate ammonium, $Al_2O_3$, $GeO_2$ were mixed and were used as solid electrolyte material powder. From the solid electrolyte material powder, $Li_{1.3}Al_{0.3}Ge_{1.7}(PO_4)_3$ including a predetermined amount of Co was made by a solid phase synthesizing. The resulting power was dry-crushed by $ZrO_2$ balls of 5 mm φ (30 min at a rotation speed of 400 rpm with use of planetary ball mil). The D90% grain diameter was 5 μm or less. Moreover, the resulting powder was wet-crushed (dispersing medium: ion exchange water or ethanol) with beads of 1.5 mm φ so that the D90% grain diameter was 3 μm. Further, the resulting powder was wet-crushed with beads of 1 mm φ so that the D50% grain diameter was 0.3 μm. Thus, solid electrolyte slurry having the D50% grain diameter of 0.3 μm and the D90% grain diameter of 2 μm was made. Solid electrolyte paste was obtained by adding a binder to the resulting slurry. And, green sheet having a thickness of 0.6 μm was made. $Li_{1.3}Al_{0.3}Ti_{1.7}(PO_4)_3$ including a predetermined amount of $LiCoPO_4$ and Co was synthesized by a solid phase synthesizing as well as the above-mentioned oxide. The resulting $Li_{1.3}Al_{0.3}Ti_{1.7}(PO_4)_3$ was wet blended and was subjected to dispersing. Thus, slurry was obtained. A binder and Pd paste were added to the slurry. Thus, paste for electrode layer was made.

The paste for electrode layer having a thickness of 2 μm was printed on the green sheet by using a predetermined pattern screen. And the Pd paste as paste for electric collector layer having a thickness of 0.7 μm was printed on the paste for electrode layer. Moreover, the paste for electrode layer having a thickness of 2 μm was printed on the Pd paste. 11 numbers of the resulting sheets were stacked so that each electrode is alternately shifted to right and left sides. And stacked green sheets having an average thickness of 30 μm was affixed to an upper face and a lower face of the stacked sheets. The multilayer structure was crimped by heating pressing. And the multilayer structure was cut into a predetermined size by a dicer.

The binder was removed from 100 sample chips by thermal treatment within a temperature range of 300 degrees C. to 500 degrees C. The resulting multilayer structures were sintered within a temperature range of 900 degrees C. or less. Thus, sintered structures were made. After the thermal treatment, the length L was 0.3 mm. The width W was 1.5 mm. The thickness T was 0.1 mm. The ratio L/W was 0.2. (L+W)/T was 18.0. Cross sections of sintered structures were observed by SEM. And, thicknesses of layers were measured. The average thickness of the electric collector layers was 0.5 μm. The average thickness of the solid electrolyte layer was 0.5 μm.

(Example 2) In an example 2, the length L was 0.3 mm. The width W was 0.28 mm. The thickness T was 0.1 mm. The ratio L/W was 1.07. (L+W)/T was 5.8. Other conditions were the same as those of the example 1.

(Example 3) In an example 3, the number of the stacked sheets after the printing was 3. A cover layer having a thickness of 20 μm was adhered on the staked sheets. Another cover layer having a thickness of 20 μm was adhered under the stacked sheets. After that, the stacked sheets were fired. The length L was 0.5 mm. The width W was 1 mm. The thickness T was 0.05 mm. The ratio L/W was 0.50. (L+W)/T was 30.0. Other conditions were the same as those of the example 1.

(Example 4) In an example 4, the length L was 0.5 mm. The width W was 1 mm. The thickness T was 0.1 mm. The ratio L/W was 0.50. (L+W)/T was 15.0. Other conditions were the same as those of the example 1.

(Example 5) In an example 5, the thickness of the solid electrolyte sheet was 6 μm. The thickness of the printed electrical collector layer was 6 μm. The length L was 0.5 mm. The width W was 1 mm. The thickness T was 0.2 mm. The ratio L/W was 0.50. (L+W)/T was 7.5. The average thicknesses of the electrical collector layers and the solid electrolyte layers were 5 μm. Other conditions were the same as those of the example 1.

(Example 6) In an example 6, the thickness of the solid electrolyte sheet was 11 μm. The thickness of the printed electrical collector layer was 11 μm. The thickness of the cover layer a 50 μm. 18 numbers of the printed sheets were stacked. The length L was 0.5 mm. The width W was 1 mm. The thickness T was 0.5 mm. The ratio L/W was 0.50. (L+W)/T was 3.0. The average thicknesses of the electrical collector layers and the solid electrolyte layers were 10 μm. Other conditions were the same as those of the example 1.

(Example 7) In an example 7, the thickness of the solid electrolyte sheet was 6 μm. The thickness of the printed electrical collector layer was 1.5 μm. The thickness of the printed electrode layer was 6 μm. The thickness of the cover layer was 100 μm. 51 numbers of the printed sheets were stacked. The length L was 10 mm. The width W was 50 mm. The thickness T was 1 mm. The ratio L/W was 0.20. (L+W)/T was 60.0. The average thickness of the electrical collector layers was 1 μm. The average thickness of the solid electrolyte layers was 5 μm. Other conditions were the same as those of the example 1.

(Example 8) In an example 8, the thickness of the solid electrolyte sheet was 6 μm. The thickness of the printed electrical collector layer was 6 μm. The thickness of the printed electrode layer was 6 μm. The thickness of the cover layer was 100 μm. 41 numbers of the printed sheets were stacked. The length L was 30 mm. The width W was 50 mm. The thickness T was 1 mm. The ratio L/W was 0.60. (L+W)/T was 80.0. The average thicknesses of the electrical collector layers and the slid electrolyte layers were 5 μm. Other conditions were the same as those of the example 1.

(Example 9) In an example 9, the thickness of the solid electrolyte sheet was 6 μm. The thickness of the printed electrical collector layer was 6 μm. The thickness of the printed electrode layer was 6 μm. The thickness of the cover layer was 100 μm. 41 numbers of the printed sheets were stacked. The length L was 40 mm. The width W was 40 mm. The thickness T was 1 mm. The ratio L/W was 1.00, (L+W)/T was 80.0. The average thicknesses of the electrical collector layers and the solid electrolyte layers were 5 μm. Other conditions were the same as those of the example 1.

(Example 10) In an example 10, carbon black was used as the material of the electrical collector and the conductive auxiliary agent. The length L was 0.3 mm. The width W was 1.5 mm. The thickness T was 0.1 mm. The ratio L/W was 0.20. (L+W)/T was 18.0. The average thicknesses of the electrical collector layers and the solid electrolyte layers were 0.5 μm. Other conditions were the same as those of the example 1.

(Example 11) In an example 11, carbon black was used as the material of the conductive auxiliary agent. The thickness of the electrode was 4.6 μm. The electrode was printed only once. The electric collector was not made. The length L was 0.3 mm. The width W was 1.5 mm. The thickness T was 0.1 mm. The ratio L/W was 0.20, (L+W)/T was 18.0. The average thickness of the solid electrolyte layer was 0.5 μm. Other conditions were the same as those of the example 1.

(Comparative example 1) In a comparative example 1, the length L was 1 mm. The width W was 0.7 mm. The thickness T was 0.1 mm. The ratio L/W was 1.43. (L+W)/T was 17.0. The average thicknesses of the electrical collector layers and the solid electrolyte layers were 0.5 μm. Other conditions were the same as those of the example 1.

(Comparative example 2) In a comparative example 2, the thickness of the solid electrolyte sheet was 7 μm. The thickness of the printed electrical collector layer was 12 μm. The thickness of the printed electrode layer was 2 μm. The thickness of the cover layer was 30 μm. 31 numbers of the printed sheets were stacked. The length L was 1 mm. The width W was 0.85 mm. The thickness T was 0.7 mm. The ratio L/W was 1.18. (L+W)/T was 2.6. The average thickness of the electrical collector layers was 11 μm. The average thickness of the solid electrolyte layers was 6 μm. Other conditions were the same as those of the example 1.

(Analysis) Rate characteristic was measured, with respect to the sintered structures of the examples 1 to 11 and the comparative examples 1 and 2. Two end faces of the sintered structures to which electrode layers were exposed were coated with silver paste. Thus, a pair of external electrodes were formed. Next, charging and discharging were performed between 0.2 C and 1 C in a voltage range of 2.5 V to 0 V at 25 degrees C. A ratio of measured discharge capacities (discharge capacity of 1 C/discharge capacity of 0.2 C) was measured as the rate characteristic. FIG. 6 illustrates the results. As illustrated in FIG. 6, the rate characteristic was 65% or more in the examples 1 to 11. It is thought that this was because the ratio L/W was 0.20 or more and 1.1 or less, and the electrical resistance of current collection was suppressed. On the other hand, in the comparative examples 1 and 2, the rate characteristic was less than 65%. It is thought that this was because the ratio L/W was more than 1.1, and the electrical resistance was not sufficiently reduced.

Next, the sintered structures of the examples 1 to 5, 10 and 11, and the comparative example 1 were subjected to a three-point bending test by pressing an indenter. Thus, transverse strength was measured. And, a ratio of the measured transverse strength with respect to a transverse strength of a standard chip in which the length L and the width W were reversed was measured. For example, in the example 1, the length L and the width W of the standard chip was 1.5 mm and 0.3 mm. The transverse strengths of the examples 1 to 5, 10 and 11 were one time or more of the transverse strength of the standard chip. It is thought that the ratio L/W was 1.1 or less, the width W was sufficiently large, and the length of the external electrode was long. On the other hand, in the comparative example 1, the transverse strength was less than one time of the transverse strength of the standard chip. It is thought that this was because the ratio L/W was more than 1.1, the width W was not sufficiently large, and the length of the external electrode was small. With respect to the examples 6 to 9, the ratio with respect to the standard chip was not measured. However, the sintered structures of the examples 6 to 9 had transverse strength securing favorable mounting.

An occurrence ratio of samples, in which a crack or delamination occurred, with respect to the 100 samples was low, in the examples 1 to 11. It is thought that this was because the ratio L/W was 1.1 or less and (L+W)/T was 0.3 or more and 85 or less in the examples 1 to 11. In this case, it is thought that: the samples were not excessively thick; sintering stability was secured; delamination was suppressed; the strength of the samples was large; and the occurrence of the crack was suppressed. On the other hand, in the comparative examples 1 and 2, the occurrence ratio of samples, in which a crack or delamination occurred, with respect to the 100 samples was high. It is thought that this was because the ratio L/W was more 1.1, and the occurrence ratio of the crack slightly increased in accordance with reduction of the strength of the samples, in the comparative example 1. And it is thought that this was because the firing was not stable because of the large thickness of the samples, and the occurrence ratio of the delamination was large.

Although the embodiments of the present invention have been described in detail, it is to be understood that the various change, substitutions, and alterations could be made hereto without departing from the spirit and scope of the invention.

What is claimed is:
1. An all solid battery comprising:
a multilayer chip in which each of a plurality of solid electrolyte layers and each of a plurality of electrodes are alternately stacked, a main component of the solid electrolyte layers being phosphoric acid salt-based solid electrolyte, the multilayer chip having a rectangular parallelepiped shape, the plurality of electrodes being alternately exposed to a first end face and a second end face of the multilayer chip, the first end face facing with the second end face,
a first external electrode provided on the first end face so as to directly cover the first end face;
a second external electrode provided on the second end face so as to directly cover the second end face; and
wherein L/W is 0.20 or more and 0.60 or less and (L+W)/T is 15.0 or more and 30.0 or less, when a length of the multilayer chip in a first direction in which the first end face faces with the second end face is L, and a width of the multilayer chip in a second direction that is perpendicular to the first direction and a stacking direction of the multilayer chip is W, and T is a thickness of the multilayer chip in the stacking direction.

2. The all solid battery as claimed in claim 1,
wherein the plurality of electrodes have a structure in which an electric collector layer is sandwiched by two electrode layers including an electrode active material,
wherein an average thickness of electric collector layers of the plurality of electrodes is 10 μm or less.

3. The all solid battery as claimed in claim 2, wherein the average thickness of electric collector layers of the plurality of electrodes is 0.5 μm or more and 5 μm or less.

4. The all solid battery as claimed in claim 1, wherein an average thickness of the plurality of solid electrolyte layers is 10 μm or less.

5. The all solid battery as claimed in claim 4, wherein the average thickness of the plurality of solid electrolyte layers is 0.5 μm or more and 5 μm or less.

6. The all solid battery as claimed in claim 1, wherein the phosphoric acid salt-based solid electrolyte has a NASICON structure.

7. The all solid battery as claimed in claim 1, wherein the plurality of electrodes have a structure in which an electric collector layer is sandwiched by two electrode layers including an electrode active material.

* * * * *